(12) United States Patent
Narishima et al.

(10) Patent No.: US 8,490,987 B2
(45) Date of Patent: Jul. 23, 2013

(54) STABILIZER BAR

(75) Inventors: Hidetaka Narishima, Ichihara (JP); Yukio Yamagishi, Ichihara (JP); Naoki Tokita, Ichihara (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 196 days.

(21) Appl. No.: 13/120,620

(22) PCT Filed: Sep. 18, 2009

(86) PCT No.: PCT/JP2009/066384
§ 371 (c)(1),
(2), (4) Date: Mar. 23, 2011

(87) PCT Pub. No.: WO2010/035712
PCT Pub. Date: Apr. 1, 2010

(65) Prior Publication Data
US 2011/0175315 A1    Jul. 21, 2011

(30) Foreign Application Priority Data
Sep. 25, 2008 (JP) ................. 2008-245725

(51) Int. Cl.
*B60G 21/055* (2006.01)
(52) U.S. Cl.
USPC .................................. 280/124.107
(58) Field of Classification Search
USPC ....... 280/124.107, 124.13, 124.137, 124.149, 280/124.152
See application file for complete search history.

(56) References Cited

U.S. PATENT DOCUMENTS
2,595,695 A * 5/1952 Packer et al. .......... 16/444

FOREIGN PATENT DOCUMENTS

| EP | 1 566 229 A1 | 8/2005 |
|---|---|---|
| JP | 55-153208 | 4/1979 |
| JP | 57-74807 | 10/1980 |
| JP | 58-133909 A | 8/1983 |
| JP | 61-86036 | 5/1986 |
| JP | 2-23366 | 5/1990 |
| JP | 4-309420 | 11/1992 |
| JP | 2008-143313 | 6/2008 |

OTHER PUBLICATIONS

Office Action for Taiwanese Application No. 098132063, dated Mar. 19, 2012.

(Continued)

*Primary Examiner* — Faye M. Fleming
(74) *Attorney, Agent, or Firm* — Marshall, Gerstein & Borun LLP

(57) ABSTRACT

There is provided a stabilizer bar in which through holes are not positionally offset even if the attachment portions are bent after the through holes are formed therein.

A stabilizer bar is composed of a steel pipe material bent to an approximate U-shape and has attachment portions formed by deforming the free ends of the steel material in a flat plate shape. Through holes are formed in the attachment portions to fix them to a vehicle body, and each of the attachment portions has a cross section configured as a three-layer structure that is partitioned by first and second overlapping surfaces of a folded hollow portion. That is, the three-layered structure is composed of an upper layer portion positioned on the first overlapping surfaces, an intermediate layer portion positioned between the first and second overlapping surfaces, and a lower layer portion positioned under the first overlapping surfaces. Here, the first and second overlapping surfaces are disposed such that the cross section thereof is formed in an X-shape.

8 Claims, 12 Drawing Sheets

OTHER PUBLICATIONS

International Search Report for Application No. PCT/JP2009/066384, dated Dec. 1, 2009.

Notice of Reasons for Rejection for Japanese Application No. 2008-245725, dated Nov. 20, 2009.

* cited by examiner

STABILIZER BAR

BACKGROUND OF THE INVENTION

1. Field of the Invention

The present invention relates to a stabilizer bar used as a device for preventing rolling of vehicles such as passenger cars, trucks and the like.

2. Description of the Related Art

In general, vehicles such as passenger cars, trucks and the like have independent suspensions coupled with right and left wheels and a stabilizer is attached to the independent suspensions to prevent rolling of the vehicle. The stabilizer is formed of a steel tube material to reduce weight. Further, the stabilizer is three-dimensionally processed to prevent interference with various components disposed on a lower surface of a vehicle body such as differential gears, propeller shafts and the like.

Specifically, the stabilizer is formed in an approximate U-shape, uses its central linear portion as a torsion-bar spring (torsion unit), and forms arm portions by curving both sides of the central linear portion. An attachment portion, which is flattened by deformation processing, is formed at the free end of each arm portion extending from the respective curved portions. Through holes are formed in the attachment portions to attach the attachment portions to a vehicle body.

Recently, since the configuration of vehicle bodies has become more complex, the space available for attaching a stabilizer bar has been reduced. To cope with this problem, there have been demands to make the attachment portions, the width dimensions of which are increased by being flattened, more compact. Further, there have also been demands to bend the stabilizer at the positions of the attachment portions due to restrictions in attachment direction and the like.

Demands to make the attachment portions compact can be met by cutting and removing the parts of the attachment portions whose size in a width direction has been increased by flattening of the steel tube material by pressing and deforming the same.

Specifically, as shown in FIGS. 8A to 8E, in an attachment portion 80 (FIG. 8B), in which the free end of an arm 16 is pressed and deformed in the directions of arrows P1 (FIG. 8A) and which has a thickness T1 (about twice the wall thickness a of the pipe material) formed in a flat shape and a through hole 20 formed therein, the width dimension of the attachment portion 80, which has been increased to a width W1, can be reduced (FIG. 8C) by cutting and removing (trimming) the ends 80A of the attachment portion 80 along the positions of cutting lines 82 to a cut width W2 as a requested dimension.

However, in the trimming, since the inner peripheral surface 16I of the pipe material has been linearly extended, both the end portions of overlapping surfaces 84 having a length L1 (L1>W2) are cut off together with the ends 80A of the pipe material as shown in FIG. 8D (a cross section taken along S1-S1).

As a result, since the continuous property of the pipe material surrounding the overlapping surfaces 84 is lost as shown in FIG. 8E, the upper part 80U of the attachment portion 80 is separated from the lower part 80D thereof at the position of the overlapping surfaces 84.

When the attachment portion 80, in a state after it is trimmed as shown in FIG. 9A, is bent, a problem arises in that the through holes 20 are positionally offset from each other (FIG. 9B) and cannot be used because a radius of curvature of the upper part 80U of the pipe material is different from that of the lower part 80D thereof and thus demands for bending processing cannot be met.

Accordingly, a method of inserting solid materials into both end sides of the steel tube material and forming attachment portions by pressing and deforming the steel tube material together with the solid material has been proposed (Japanese Patent Application Laid-Open (JP-A) No. 2008-143313). However, the method of JP-A No. 2008-143313 increases costs.

In view of the above circumstances, an object of the invention is to provide a stabilizer bar in which through holes are not positionally offset from each other even if the stabilizer bar is bent after the through holes are formed at attachment portions.

DISCLOSURE OF INVENTION

A stabilizer bar according to a first aspect of the present invention includes attachment portions formed in a flattened three-layer structure by folding and compressing the end portions of a pipe material for forming the stabilizer bar, the three layers being divided by respective overlapping surfaces.

According to the first aspect of the invention, since the attachment portions have a three-layered structure, the expansion of the attachment portions can be reduced as compared with a conventional two-layered structure and the thickness of the attachment portions can be increased. With this configuration, in a width direction cutting process for reducing the width of the attachment portions, since the amount of the pipe material to be cut and removed is reduced, the periphery of the inner peripheral surface of a folded hollow portion can be continuously surrounded by the pipe material. Therefore, the pipe material can be prevented from being separated in a vertical direction.

As a result, even if through holes are formed in the attachment portions and the attachment portions are bent after the through holes are formed, the through holes are not positionally offset.

According to a second aspect of the invention, in the stabilizer bar of the first aspect, the overlapping surfaces have an X-shaped cross section.

According to the second aspect of the invention, the cross section of the overlapping surfaces of each attachment portion is formed in an X-shape. With this configuration, since distance is secured between the cutting lines, which are separated from each other in the width direction of the attachment portions, and the end portions of the overlapping surfaces of the folded hollow portion, the attachment portions can be cut off along positions at which the continuous property of the pipe material surrounding the periphery of the folded hollow portion is maintained.

As a result, even if through holes are formed in the attachment portions and the attachment portions are bent after the through holes are formed, the through holes are not positionally offset because the coupling strength of the pipe material is maintained.

According to a third aspect of the invention, in the stabilizer bar of the first aspect, the overlapping surfaces have a Y-shaped cross section.

According to the third aspect of the invention, the cross section of the overlapping surfaces of each attachment portion is formed in a Y-shape. With this configuration, since distance is secured between the cutting lines, which are separated from each other in the width direction of the attachment portions, and the end portions of the overlapping surfaces of the folded hollow portion, the attachment portions can be cut off along positions at which the continuous property of the pipe material surrounding the periphery of the folded hollow portion is maintained.

As a result, even if through holes are formed in the attachment portions and the attachment portions are bent after the through holes are formed, the through holes are not positionally offset because the coupling strength of the pipe material is maintained.

According to fourth to sixth aspects of the invention, in the stabilizer bar, the thickness of the attachment portions is twice or more the wall thickness of the pipe material.

According to the fourth to sixth aspects of the invention, the strength of the attachment portions can be increased by setting the thickness of the attachment portions to twice or more that of the pipe material.

Since the stabilizer bar of the invention is configured as described above, even if through holes are formed in the attachment portions and then the attachment portions are bent, the through holes are not positionally offset.

BEST MODE FOR CARRYING OUT THE INVENTION

Figure 1:
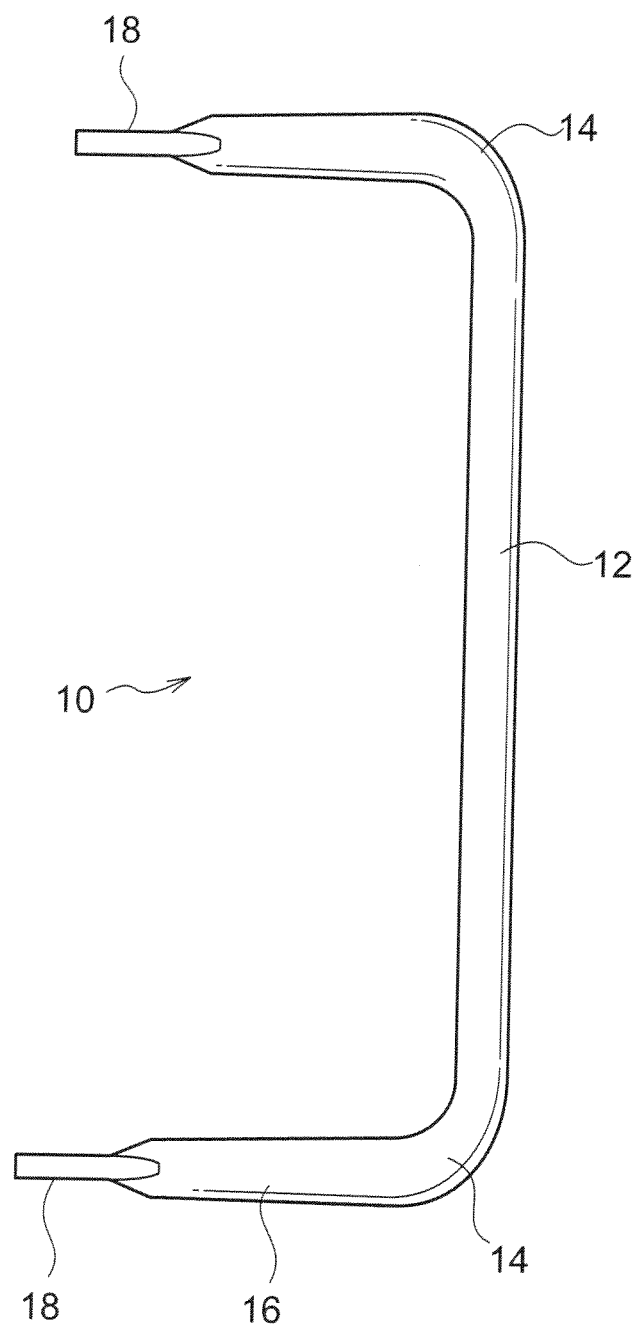
FIG. 1 is a view showing a basic configuration of a stabilizer bar according to an exemplary embodiment of the present invention.

As shown in FIG. 1, a stabilizer bar 10 is composed of a steel pipe material and bent to an approximate U-shape. The stabilizer bar 10 has a torsion portion 12 of a central linear portion which is used as a torsion bar spring, curved portions 14 formed by bending both ends of the torsion portion 12, and arm portions 16 linearly extending from the curved portions 14.

Figure 2A:
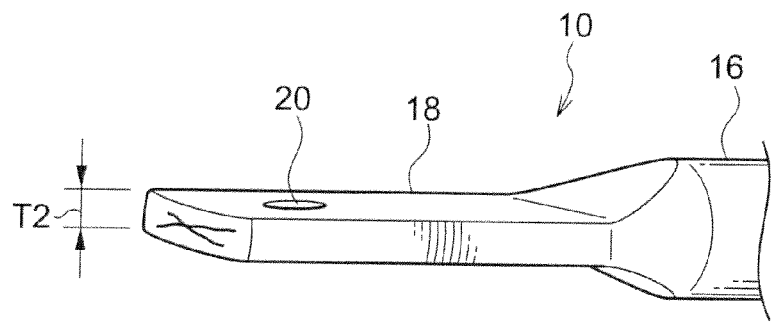
FIG. 2A is a perspective view showing the shape of an attachment portion according to the exemplary embodiment of the invention after pressing.
Figure 2B:
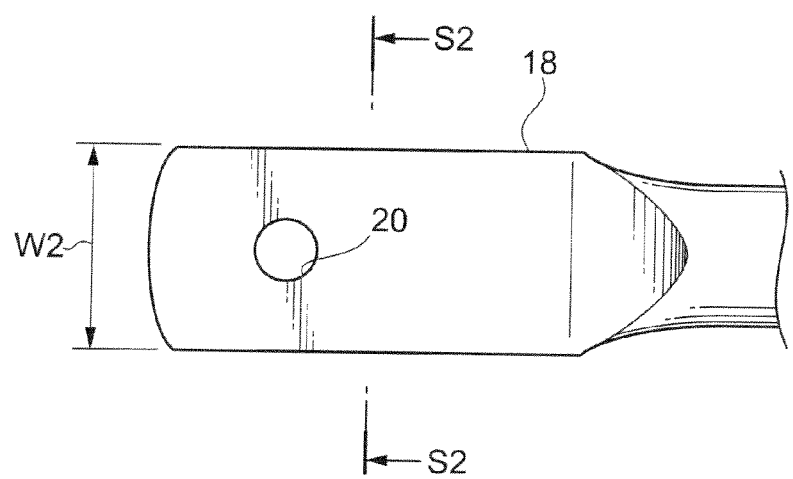
FIG. 2B is a plan view showing the shape of the attachment portion according to the exemplary embodiment of the invention after pressing.

As shown in FIGS. 2A and 2B, flat plate-shaped attachment portions 18 having a thickness T2 are disposed at the free ends of the arm portions 16. The attachment portions 18 are flattened by deforming the extreme ends of the arm portions 16, and through holes 20 are formed in the attachment portions 18 to fix the attachment portions 18 to a vehicle body (not shown).

Figure 2C:
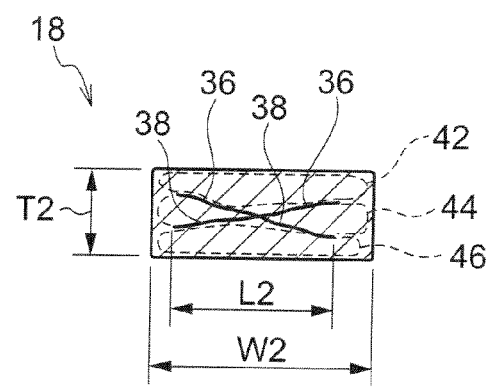
FIG. 2C is a sectional view showing the shape of the attachment portion according to the exemplary embodiment of the invention after pressing.

As shown in FIG. 2C (cross section along line S2-S2 in FIG. 2B), the attachment portions 18 have a three-layered structure which is partitioned by overlapping surfaces 36, 38 of a folded hollow portion.

That is, the three-layered structure is composed of an upper layer portion 42 positioned on the overlapping surfaces 36, an intermediate layer portion 44 positioned between the overlapping surfaces 36, 38, and a lower layer portion 46 positioned under the overlapping surfaces 38.

Here, the overlapping surfaces 36, 38 are disposed such that the cross section thereof is formed in an X-shape.

As described above, the two sets of overlapping surfaces 36, 38 are folded into an X-shape and concentrated at a central portion. As a result, since a projecting length L2 of the overlapping surfaces 36, 38 in a width direction is shorter than a cut width W2, a state in which the pipe material surrounds the periphery of the overlapping surfaces 36, 38 is maintained even if the attachment portion 18 is cut to the cut width W2.

As a result, since the pipe material can maintain the mechanical strength to withstand bending, the through holes 20 are not positionally offset even if through holes 20 are formed in the attachment portions 18 and then the attachment portions 18 are bent.

Further, since the thickness T2 of the attachment portions 18 can be increased to twice or more the wall thickness a of the pipe material by configuring the attachment portions 18 as a three-layered structure, the strength of the attachment portions 18 can be increased.

Next, a method of processing the attachment portions 18 will be explained.

Figure 3A:
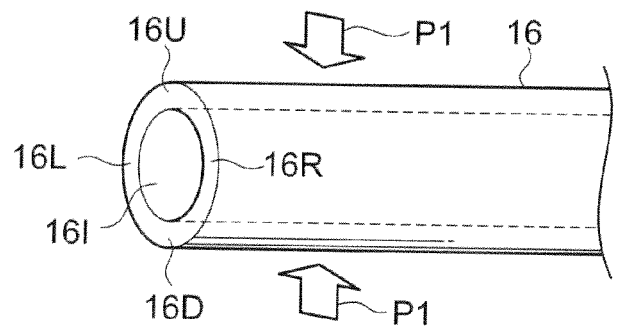
FIGS. 3A to 3C are main portion perspective views showing a method of molding the attachment portion of the stabilizer bar according to the exemplary embodiment of the invention.

First, first processing is executed to deform each free end of the arm portions 16 as shown in FIG. 3A in the directions of arrows P1.

That is, the arm portion 16 is fixed laterally, and the free end of the arm portion 16 is restricted from expanding in a lateral direction. Specifically, the free end of the arm portion 16 is restricted so that the right side 16R and the left side 16L of the pipe material do not exceed the outer diameter of the arm portion 16 when viewed from an end face thereof.

Then, the upper part 16U and the lower part 16D of the pipe material are compressed in the direction of the arrow P1 (vertical direction). Here, the upper part 16U of the pipe material is bent downward and deformed in a downwardly recessed shape. Likewise, the lower part 16D of the pipe material is bent upward and deformed in an upwardly recessed shape.

Figure 3B:
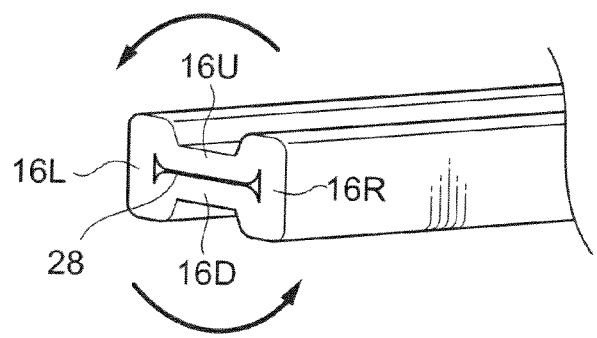

As a result, the outer peripheral surfaces of the right side 16R and the left side 16L of the pipe material of the free end of the arm portion 16 are formed as parallel planes as shown in FIG. 3B, and the upper pipe material 16U and the lower pipe material 16D are formed in a concavely bent sectional shape. Note that the inner peripheral surface 161 of the pipe material of the arm portion 16 is extended linearly in a direction parallel to concave bottom surfaces and forms overlapping surfaces 28. Hereinafter, this shape is called an H-shape.

Figure 3C:
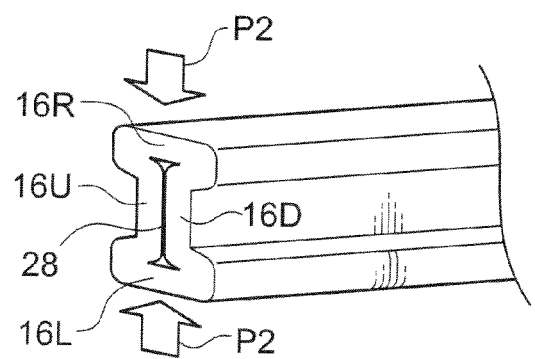

Next, as shown in FIG. 3C, the arm portion 16 is rotated 90° in the direction of the arrows shown in FIG. 3B, such that the concave portions positioned at the top and bottom of the H-shape are positioned to the right and left, and the arm portion 16 is pressed in the direction of arrows P2.

Figure 4:
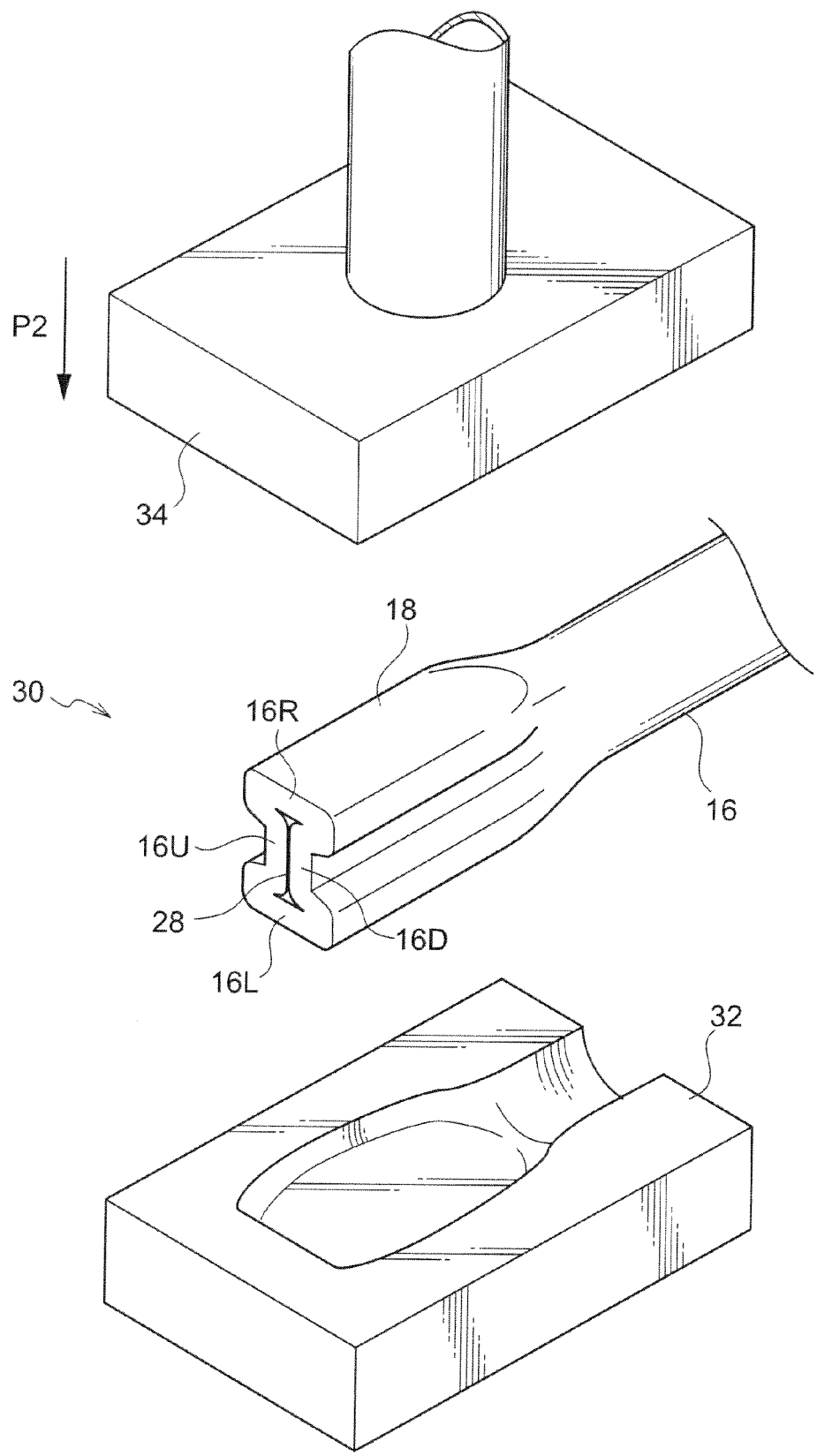
FIG. 4 is a view showing how the attachment portion according to the exemplary embodiment of the invention is pressed.

Specifically, as shown in FIG. 4, the pipe materials 16R and 16L of the arm portion 16 formed in the H-shape are disposed in a vertical direction and are flattened by deformation in the direction of the arrow P2 by a press machine 30.

The press machine 30 is a generally widely-used press machine and sets the free end of the arm portion 16 in a lower mold 32 as a fixed unit and presses the free end by moving an upper mold 34 as a moving unit in the direction of the arrow P2.

With this operation, the free end of the arm portion 16 is pressed and deformed from the H-shape into a flat plate shape.

Figure 5A:
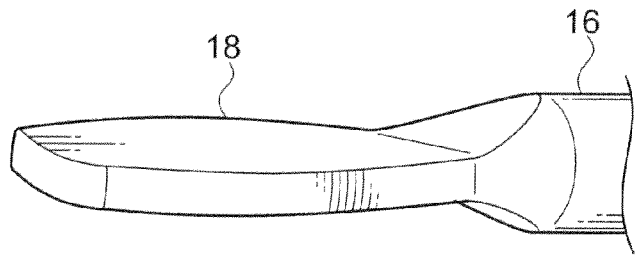
FIGS. 5A to 5C are views illustrating the sectional shape of the attachment portion according to the exemplary embodiment of the invention after pressing.

That is, as shown in FIG. 5A, the attachment portion 18 after it is pressed by the press machine 30 is deformed in the vertical direction and formed in a flat plate shape.

Figure 5B:
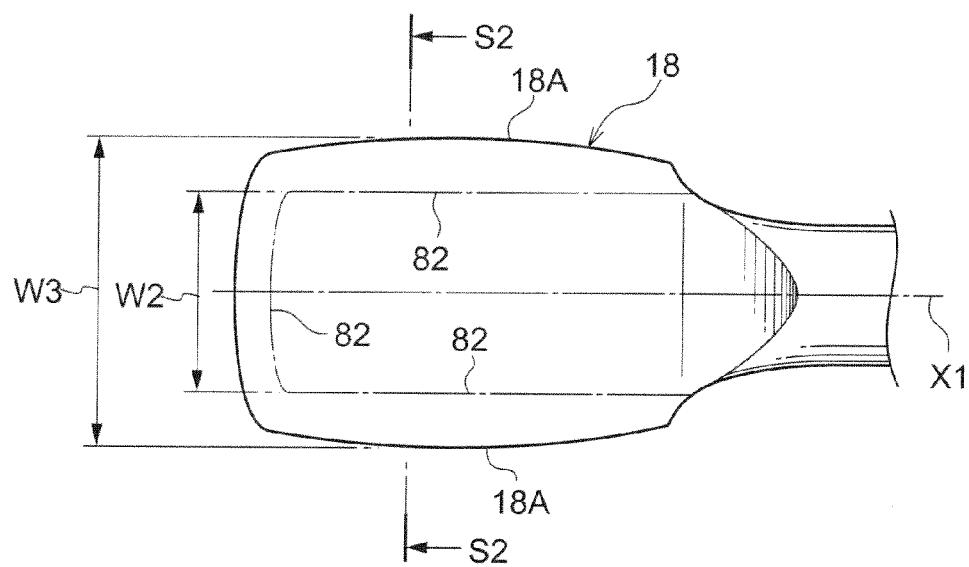

Here, as shown in FIG. 5B, expanding portions 18A, which are symmetrically expanded to left and right, are formed at the attachment portion 18 in a direction (width direction) orthogonal to a center axis X1 of the arm portion 16 (width dimension: W3). The attachment portion 18 can be finished to a cut width W2 by cutting and removing the expanding portions 18A along cutting lines 82.

Figure 5C:
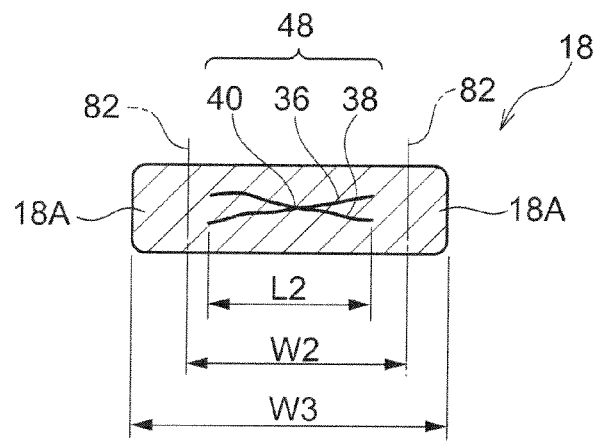

Note that as shown in FIG. 5C (cross section along line S2-S2 in FIG. 5B), in the cross section of attachment portion 18, since the projecting length of the bent surfaces 36, 38 in the width direction is set to L2 (L2<W2), a pipe material portion can be maintained around the peripheries of the folded surfaces 36, 38 even if the expanding portions 18A are cut and removed along the cutting lines 82.

Here, the cross sectional shape of the attachment portion 18 is explained.

Figure 6A:
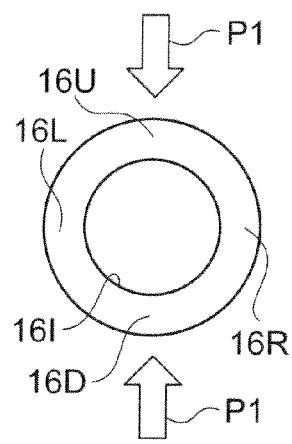
FIGS. 6A to 6H are views illustrating how the sectional shape of the attachment portion according to the exemplary embodiment of the invention changes when it is pressed.
Figure 6B:
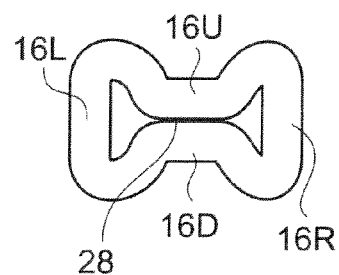

At the free end of the arm portion 16 having a circular cross section as shown in FIG. 6A before it is pressed, the pipe materials 16U and 16D are deformed into a concave state in the direction of the arrows P1, and the outer peripheral surfaces of the pipe materials 16L and 16R in a right and left direction orthogonal to the pipe materials 16U and 16D are formed in the flat plate shape so that the free end of the arm portion 16 is formed in the H-shape shown in FIG. 6B. Here, the inner peripheral surfaces 161 of the concave portions 16U, 16D, which are deformed in the concave shape and positioned vertically, are abutted with each other and form a folded surface 28.

Figure 6C:
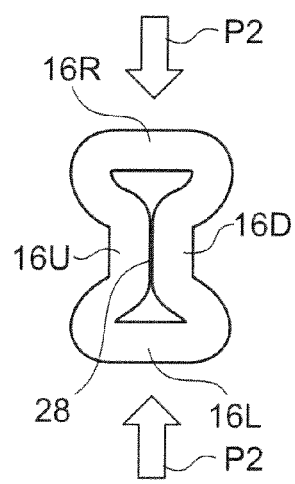
Figure 6D:
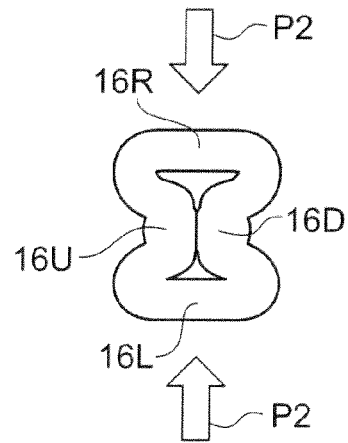

Next, as shown in FIG. 6C, the attachment portion 16 formed in the H-shape is rotated 90° and set in the press machine 30 described above. As shown in FIG. 6D, the press machine 30 applies a force from the direction of P2 and deforms the pipe materials 16L and 16R to the flat plate shape from the vertical direction. That is, the concave portions 16U, 16D are compressed while being folded in on themselves.

Figure 6E:
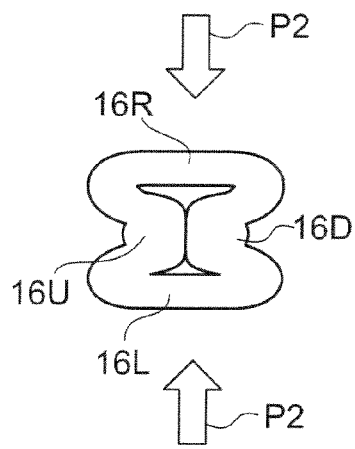

As a result, the concave portions 16U, 16D are symmetrically compressed while being folded in on themselves to the left and right so that the concave portions 16D, 16U that are being folded are compressed between the pipe material 16R acting as the upper layer portion from the upper surfaces thereof and the pipe material 16L acting as the lower layer portion from the lower surfaces thereof, as shown in FIG. 6E.

Figure 6F:
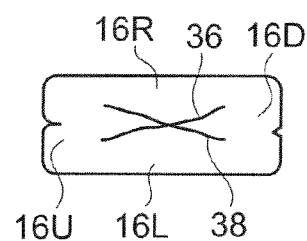

Finally, as shown in FIG. 6F, the upper part 16U and the lower part 16D forms the intermediate layer portion, the pipe material 16R is deformed at the upper side of the intermediate layer and forms the upper layer portion, and the pipe material 16L is deformed at the lower side of the intermediate layer and forms the lower layer portion, whereby the pressing process is finished. Here, the overlapping surfaces 36, 38 of the inner peripheral surface of the intermediate layer are formed in an X-shape when viewed in cross section.

Figure 6G:
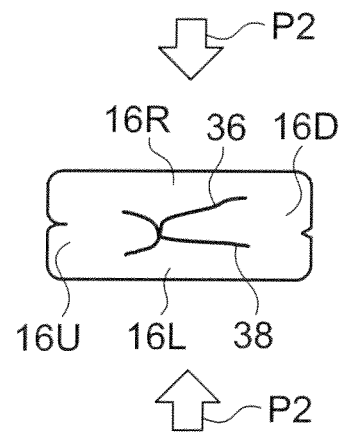

Note that, in FIGS. 6D and 6E, any one of the concave portions 16U, 16D may be bent deeper in the right and left direction due to slight asymmetry thereof and the concave portions 16U, 16D may be folded in such a manner that a contact point of the inner peripheral surfaces of the concave portions 16U, 16D is offset from a flat center position of the concave portions 16U, 16D. In this case, the X-shaped intersecting point of the overlapping surfaces 36, 38 is offset from the center of the cross section thereof when viewed from the cross section as shown in, for example, FIG. 6G.

Figure 6H:
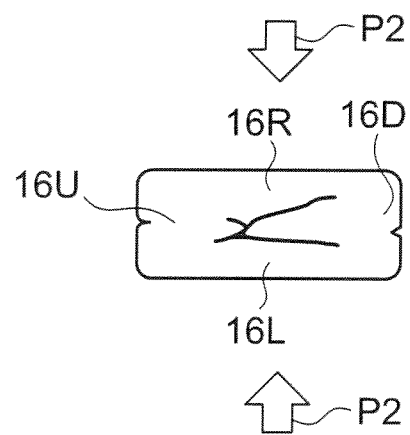

Further, as shown in, for example, FIG. 6H, a position, at which the concave portions 16U, 16D are folded, changes slightly depending on the degree of asymmetry and thus the overlapping surfaces 36, 38 are formed in an approximate Y-shape instead of the X-shape when viewed from the cross section.

Figure 7A:
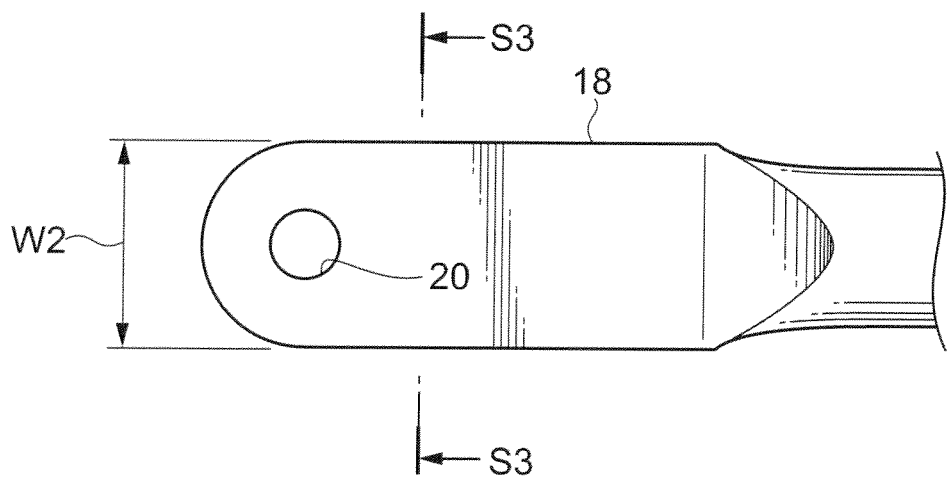
FIG. 7A is a view showing the shape of the attachment portion according to the exemplary embodiment of the invention after trimming.
Figure 7B:
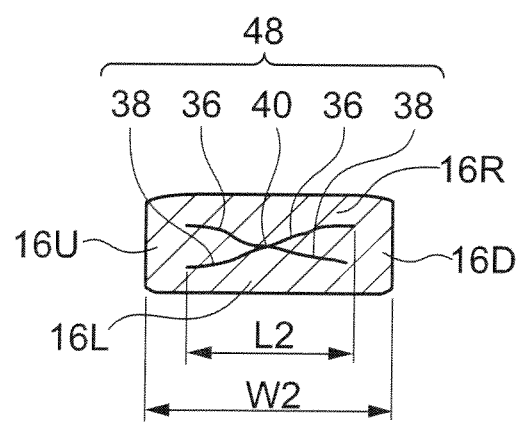
FIG. 7B is a view showing the sectional shape of the attachment portion according to the exemplary embodiment of the invention after trimming.
Figure 8A:
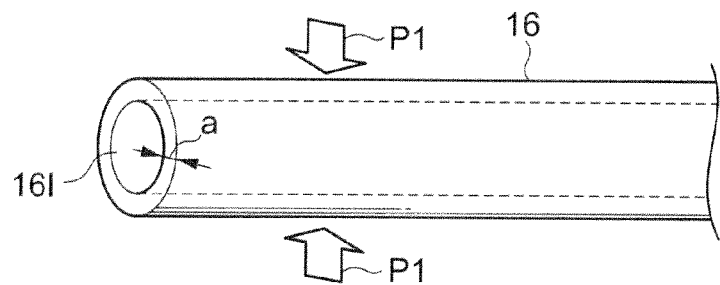
FIGS. 8A to 8E are views showing the basic configuration of an attachment portion of a conventional stabilizer bar.
Figure 8B:
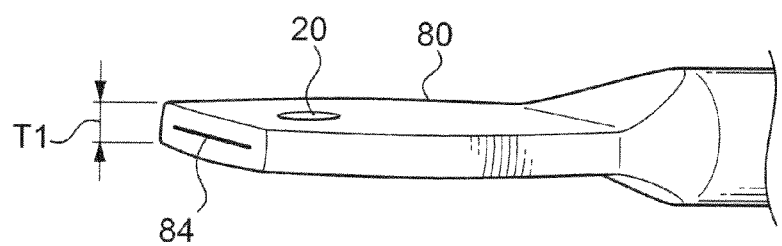
Figure 8C:
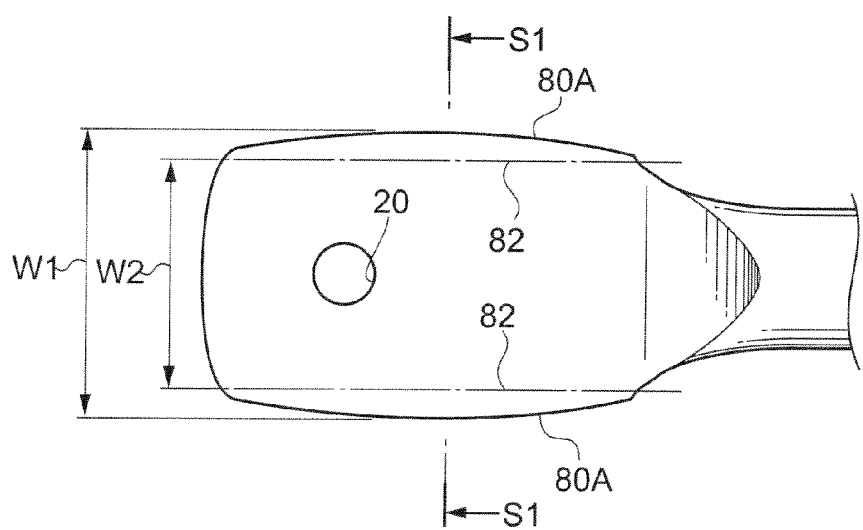
Figure 8D:
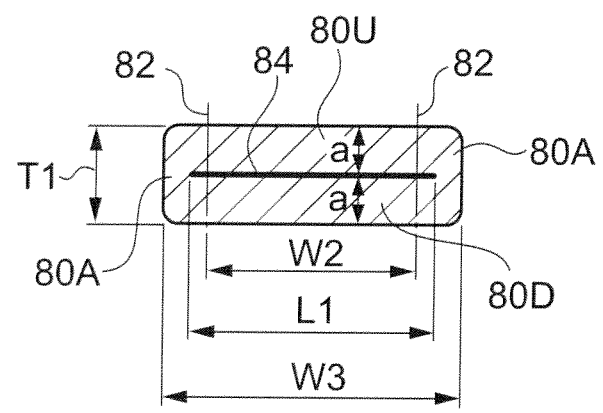
Figure 8E:
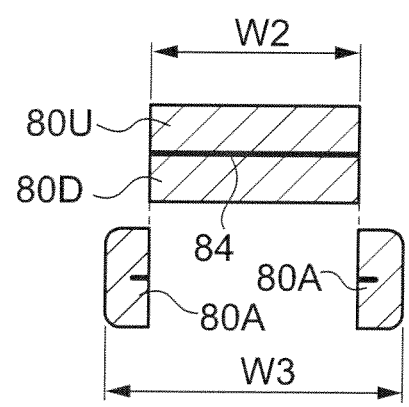
Figure 9A:
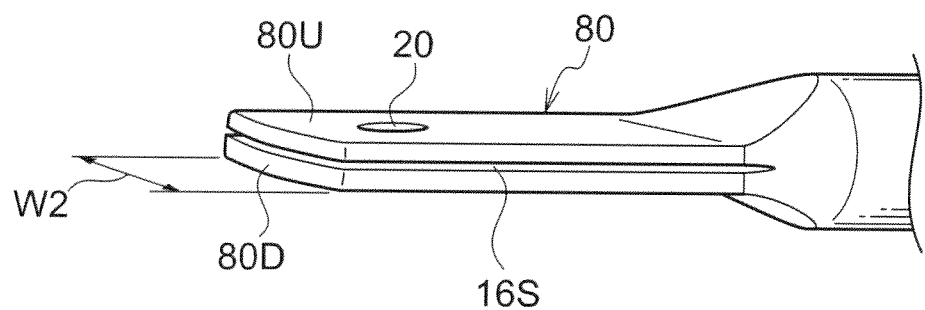
FIGS. 9A to 9B are views showing the state of the attachment portion of the conventional stabilizer bar when it is bent.
Figure 9B:
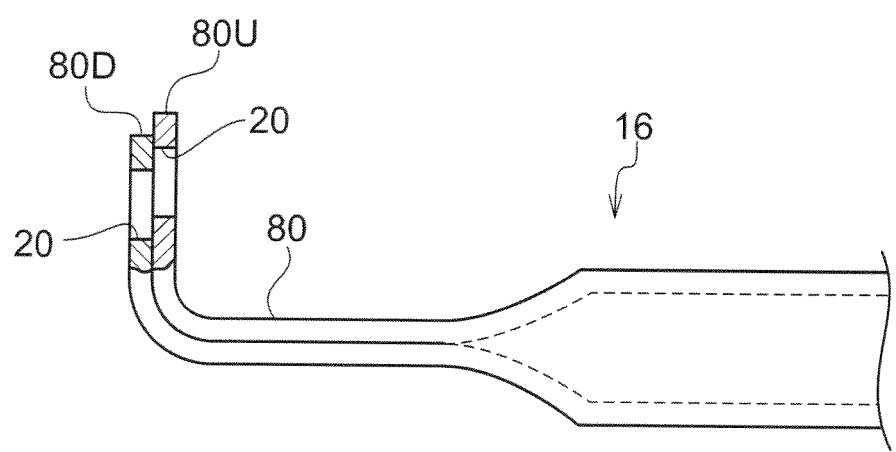

Finally, as shown in FIG. 7A, the processing of the attachment portion 18 is finished by subjecting it to the pressing processing and trimming processing. The attachment portions 18 that have been subjected to the processing are required to have the width W2, and the through holes 20 are formed in the end portions of the attachment portions 18.

What is claimed is:

1. A stabilizer bar comprising attachment portions formed in a flattened three-regioned structure by deforming and compressing end portions of a pipe material for forming the stabilizer bar, the three regions being divided by respective overlapping surfaces of an inner peripheral surface of pipe material, wherein when viewed in cross-section, the overlapping surfaces are folded from four directions toward a center, the pipe material surrounding the overlapping surfaces in a rectangular shape, two layers of material being located at an intermediate position where the overlapping surfaces intersect, one layer of material being located at end positions distal to the overlapping surfaces, and three layers of material being located between the intermediate portion and the end portions.

2. The stabilizer bar of claim 1, wherein the overlapping surfaces have an X-shaped cross section.

3. The stabilizer bar of claim 2, wherein an intersecting point of the overlapping surfaces having an X-shaped cross section is asymmetrically offset from a center of the attachment portion of the pipe material surrounding the overlapping surfaces.

4. The stabilizer bar of claim 1, wherein the thickness of each of the attachment portions is twice or more the wall thickness of the pipe material.

5. The stabilizer bar of claim 2, wherein the thickness of each of the attachment portions is twice or more the wall thickness of the pipe material.

6. The stabilizer bar of claim 3, wherein the thickness of each of the attachment portions is twice or more the wall thickness of the pipe material.

7. A method of forming a stabilizer bar of claim 1, the method comprising:
   providing a pipe having a circular cross-section;
   deforming the pipe at opposing sides to form two concave portions while restricting outward deformation of adjacent portions of the pipe from deforming beyond an original diameter of the pipe;
   rotating the pipe approximately 90 degrees; and
   deforming the pipe by applying force to the adjacent sections of the pipe to compress the concave portions until the pipe forms a flat attachment portion having three regions being divided by respective overlapping surfaces.

8. The method of claim 7, further comprising:
cutting an initial width of the flat attachment portion to form a final width of the flat attachment portion that is less than the initial width but greater than a length of the inner peripheral surface.

* * * * *